United States Patent
Hughes et al.

(10) Patent No.: US 8,615,070 B2
(45) Date of Patent: Dec. 24, 2013

(54) PERSONALIZING COMPUTERIZED CUSTOMER SERVICE

(75) Inventors: Nathan Raymond Hughes, Round Rock, TX (US); Nishant Srinath Rao, Austin, TX (US); Michelle Ann Uretsky, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/604,112

(22) Filed: Sep. 5, 2012

(65) Prior Publication Data

US 2012/0328086 A1    Dec. 27, 2012

Related U.S. Application Data

(63) Continuation of application No. 12/285,387, filed on Oct. 3, 2008, now Pat. No. 8,335,300, which is a continuation of application No. 10/606,683, filed on Jun. 26, 2003, now Pat. No. 7,515,694.

(51) Int. Cl.
  *H04M 1/64* (2006.01)
  *H04B 1/38* (2006.01)
  *G06F 15/00* (2006.01)
  *G09B 5/00* (2006.01)

(52) U.S. Cl.
  USPC ............ 379/88.01; 370/352; 379/29.01; 379/88.05; 379/88.06; 379/114.2; 379/265.12; 434/308; 455/411; 455/566; 704/8; 705/26.1; 705/37; 705/43; 709/219; 713/1; 715/205; 715/700; 725/153

(58) Field of Classification Search
  USPC ........ 379/88.01, 88.05, 88.06, 114.2, 265.12, 379/29.01; 434/308; 455/411, 566; 704/8; 705/37, 43, 26.1; 709/219; 715/205, 715/700; 370/352; 713/1; 725/153
  See application file for complete search history.

(56) References Cited

U.S. PATENT DOCUMENTS

| | | | |
|---|---|---|---|
| 5,440,615 A | 8/1995 | Caccuro et al. | |
| 6,188,683 B1 * | 2/2001 | Lang et al. | 370/352 |
| 6,205,418 B1 | 3/2001 | Li et al. | |
| 6,321,188 B1 | 11/2001 | Hayashi et al. | |
| 6,349,290 B1 | 2/2002 | Horowitz et al. | |
| 6,389,400 B1 | 5/2002 | Bushey et al. | |
| 6,424,709 B1 | 7/2002 | Doyle et al. | |
| 6,453,038 B1 | 9/2002 | McFarlane et al. | |

(Continued)

OTHER PUBLICATIONS

Office Action (Mail Date Feb. 3, 2012) for U.S. Appl. No. 12/285,387, filed Jan. 3, 2008.

(Continued)

*Primary Examiner* — Gerald Gauthier
(74) *Attorney, Agent, or Firm* — Schmeiser, Olsen & Watts, LLP; Mark C. Vallone

(57) ABSTRACT

A method and system for improving user satisfaction with a computer system that includes a computer. The computer prompts a user at a user machine to select a language usage pattern preference from at least two language usage pattern preference choices respectively including at least two text passages, each text passage expressing different text. After the prompting, the computer receives from the user machine a language usage pattern preference selected by the user from the at least two language usage pattern preference choices. The computer stores, in a user profile of the user located in a database accessible to the computer, a flag indicative of the selected language usage pattern preference.

20 Claims, 1 Drawing Sheet

(56) References Cited

U.S. PATENT DOCUMENTS

| | | | |
|---|---|---|---|
| 6,463,148 B1 | 10/2002 | Brady | |
| 6,467,038 B1* | 10/2002 | Piwonka et al. | 713/1 |
| 6,490,350 B2 | 12/2002 | McDuff et al. | |
| 6,535,596 B1 | 3/2003 | Frey et al. | |
| 6,535,600 B1 | 3/2003 | Fisher et al. | |
| 6,560,330 B2 | 5/2003 | Gabriel | |
| 6,574,798 B1* | 6/2003 | Bradley et al. | 725/153 |
| 6,584,180 B2 | 6/2003 | Nemolo | |
| 6,650,748 B1 | 11/2003 | Edwards et al. | |
| 6,704,409 B1 | 3/2004 | Dilip et al. | |
| 6,707,903 B2 | 3/2004 | Burok et al. | |
| 6,748,066 B1* | 6/2004 | Espejo et al. | 379/114.2 |
| 6,754,310 B1* | 6/2004 | Steinbrenner et al. | 379/29.01 |
| 6,766,014 B2 | 7/2004 | Flockhart et al. | |
| 6,804,662 B1 | 10/2004 | Annau et al. | |
| 6,925,155 B2 | 8/2005 | Reynolds et al. | |
| 6,947,543 B2 | 9/2005 | Alvarado et al. | |
| 7,088,814 B1* | 8/2006 | Shaffer et al. | 379/265.12 |
| 7,111,248 B2 | 9/2006 | Mulvey et al. | |
| 7,149,550 B2* | 12/2006 | Kraft et al. | 455/566 |
| 7,185,333 B1 | 2/2007 | Shafron | |
| 7,333,798 B2* | 2/2008 | Hodge | 455/411 |
| 7,515,694 B2* | 4/2009 | Hughes et al. | 379/88.06 |
| 7,529,352 B2 | 5/2009 | Hwang | |
| 7,561,674 B2 | 7/2009 | Naick et al. | |
| 7,657,263 B1 | 2/2010 | Chahrouri et al. | |
| 7,668,781 B2* | 2/2010 | Bryant et al. | 705/43 |
| 7,835,514 B1 | 11/2010 | Snyder et al. | |
| 7,865,457 B2 | 1/2011 | Ravin et al. | |
| 7,917,604 B1 | 3/2011 | Gruttadauria et al. | |
| 8,060,400 B2 | 11/2011 | Welman | |
| 8,335,300 B2* | 12/2012 | Hughes et al. | 379/88.05 |
| 2001/0051876 A1* | 12/2001 | Seigel et al. | 705/1 |
| 2002/0075300 A1 | 6/2002 | Tang et al. | |
| 2002/0152244 A1 | 10/2002 | Dean et al. | |
| 2003/0014274 A1 | 1/2003 | Chalon | |
| 2003/0027121 A1* | 2/2003 | Grudnitski et al. | 434/308 |
| 2003/0063113 A1* | 4/2003 | Andrae | 345/700 |
| 2004/0030557 A1 | 2/2004 | Culy et al. | |
| 2004/0203878 A1 | 10/2004 | Thomson | |
| 2004/0268217 A1* | 12/2004 | Hughes et al. | 715/500 |
| 2005/0033582 A1 | 2/2005 | Gadd et al. | |
| 2006/0047615 A1 | 3/2006 | Ravin et al. | |
| 2006/0206310 A1 | 9/2006 | Ravikumar et al. | |
| 2006/0239442 A1 | 10/2006 | Shaffer et al. | |
| 2007/0156856 A1* | 7/2007 | Shafron | 709/219 |
| 2007/0299983 A1 | 12/2007 | Brothers | |
| 2008/0270291 A1* | 10/2008 | Brown et al. | 705/37 |
| 2010/0088086 A1* | 4/2010 | Hughes et al. | 704/8 |
| 2011/0206190 A1 | 8/2011 | Reynolds et al. | |
| 2012/0016929 A1 | 1/2012 | Travieso et al. | |
| 2012/0047069 A1 | 2/2012 | Kelly et al. | |
| 2012/0328086 A1* | 12/2012 | Hughes et al. | 379/88.01 |

OTHER PUBLICATIONS

Amendment filed May 25, 2012 in response to Office Action (Mail Date Feb. 3, 2012) for U.S. Appl. No. 12/285,387, filed Jan. 3, 2008.
Final Office Action (Mail Date Jun. 8, 2012) for U.S. Appl. No. 12/285,387, filed Jan. 3, 2008.
Amendment filed Aug. 1, 2012 in response to Final Office Action (Mail Date Jun. 8, 2012) for U.S. Appl. No. 12/285,387, filed Jan. 3, 2008.
Notice of Allowance (Mail Date Aug. 6, 2012) for U.S. Appl. No. 12/285,387, filed Jan. 3, 2008.
Office Action (Mail Date Jun. 17, 2005) for U.S. Appl. No. 10/606,683, filed Jun. 26, 2003.
Amendment filed Oct. 17, 2005 in response to Office Action (Mail Date Jun. 17, 2005) for U.S. Appl. No. 10/606,683, filed Jun. 26, 2003.
Office Action (Mail Date Jan. 4, 2006) for U.S. Appl. No. 10/606,683, filed Jun. 26, 2003.
Amendment filed May 4, 2006 in response to Office Action (Mail Date Jan. 4, 2006) for U.S. Appl. No. 10/606,683, filed Jun. 26, 2003.
Office Action (Mail Date Jul. 5, 2006) for U.S. Appl. No. 10/606,683, filed Jun. 26, 2003.
Amendment filed Oct. 5, 2006 in response to Office Action (Mail Date Jul. 5, 2006) for U.S. Appl. No. 10/606,683, filed Jun. 26, 2003.
Office Action (Mail Date Dec. 8, 2006) for U.S. Appl. No. 10/606,683; filed Jun. 26, 2003.
Amendment filed Mar. 8, 2007 in response to Office Action (Mail Date Dec. 8, 2006) for U.S. Appl. No. 10/606,683, filed Jun. 26, 2003.
Final Office Action (Mail Date May 3, 2007) for U.S. Appl. No. 10/606,683, filed Jun. 26, 2003.
Amendment filed Jul. 2, 2007 in response to Final Office Action (Mail Date May 3, 2007) for U.S. Appl. No. 10/606,683, filed Jun. 26, 2003.
Office Action (Mail Date Jul. 25, 2007) for U.S. Appl. No. 10/606,683, filed Jun. 26, 2003.
Amendment filed Nov. 26, 2007 in response to Office Action (Mail Date Jul. 25, 2007) for U.S. Appl. No. 10/606,683, filed Jun. 26, 2003.
Office Action (Mail Date Jan. 7, 2008) for U.S. Appl. No. 10/606,683, filed Jun. 26, 2003.
Amendment filed Apr. 3, 2008 in response to Office Action (Mail Date Jan. 7, 2008) for U.S. Appl. No. 10/606,683, filed Jun. 26, 2003.
Notice re Non-Compliant Amendment (Mail Date Apr. 16, 2008) for U.S. Appl. No. 10/606,683, filed Jun. 26, 2003.
Amendment filed Apr. 25, 2008 in response to Notice re Non-Compliant Amendment (Mail Date Apr. 16, 2008) for U.S. Appl. No. 10/606,683, filed Jun. 26, 2003.
Notice of Allowance (Mail Date Jul. 3, 2008) for U.S. Appl. No. 10/606,683, filed Jun. 26, 2003.

* cited by examiner

PERSONALIZING COMPUTERIZED CUSTOMER SERVICE

This application is a continuation application claiming priority to Ser. No. 12/285,387, filed Oct. 3, 2008, now U.S. Pat No. 8,335,300, issued Dec. 18,2012, which is a continuation of Ser. No. 10/606,683, filed Jun. 26, 2003, U.S. Pat. No. 7,515,694, issued Apr. 7, 2009.

TECHNICAL FIELD

The present invention relates to facilitating interaction between a user and an information handling system. More particularly, it relates to tailoring subsequent system messages to a user as a function of the user's individual language pattern as determined from a first user system interaction.

BACKGROUND OF THE INVENTION

It is a well known practice for Web sites, particularly those involving e-commerce, to prompt a user to choose a specific language upon entering the site. Thereafter, the user is presented site data in the chosen language. For example, a user selection of "UK" as opposed to "USA" will cause subsequently presented site data to have UK English spellings, idioms, currency and the like. Every user, however, selecting a given language receives the exact same presentation of site data. In a similar manner, users of voice mail menus are early on presented with the opportunity to select a language in which to continue, e.g. English or Spanish. After making a specific language choice, every user choosing the same language receives the same subsequent messages.

U.S. Pat. No. 6,349,290 discloses a a system and method for presenting customized, personalized advice for a customer of a financial institution based on a customer profile generated by the system according to an analysis of the totality of the customer's interaction with the system. This system, and method, accommodates customer entry through a variety of modes including via a Web site, over a telephone line, at a kiosk and through an automated teller machine (ATM). A customer profile is maintained which includes a customer's choice of language and gender of voice used in presenting oral information. Many other aspects of personalized customer characteristics are also maintained relating to the customer's prior relationship history, financial status and product preferences.

It is generally accepted that people perceive information as more credible and more helpful when that information is phrased, orally or in writing, using pronouns in the person matching the speakers' typical usage. While users of computerized systems are in many ways presented information by those systems, which information is customized on many levels, it would be desirable to present information subsequent to a user's first contact with an automated computer system in a style matching that user's usual, and therefore assumed, preferred language usage pattern.

SUMMARY OF THE INVENTION

The present invention provides a method and system for dynamically adjusting the language usage pattern of messages from an automated computer system to the user as a function of that user's previously stored language usage pattern preferences. This feature is independent of the actual language spoken/written by the user. As used herein, language usage pattern includes, but is not limited to, personal pronoun preference, pacing, and volume.

The present invention in a preferred embodiment contemplates plural modes of user access to the automated computer system, such as via a Web site or via telephone. The present invention comprises front-end add on software, adaptable to existing automated, interactive computer systems, for determining user preferences in pronoun person and other components of a given user's language usage pattern.

The inventive method, as implemented in software adapted for use when viewing a Web site, first presents textual information to a user upon user entry into a system having the present invention. The user is prompted to select preferable paragraphs and/or phrases the user determines as more interesting or more helpful. These selected preferences become part of a user profile maintained by the system. Thereafter, any remaining text to be shown to the user is dynamically adjusted for presentation to the user in accordance with the user's previously designated and stored preferences.

When implemented in conjunction with a voice recognition application the present invention presents questions to a user upon first entry into the system, i.e., the user's first phone call. User answers are parsed for pronoun person usage, pacing and volume. This information is stored in the user profile maintained by the system. Thereafter, subsequent messages are presented to the user in a style corresponding to that user's language usage pattern.

The above and other aspects, features and advantages of the present invention will become apparent from the following detailed description which is presented having reference to the accompanying figures, wherein like reference numerals and symbols are used throughout to denote the same elements.

DETAILED DESCRIPTION

The present invention is preferably embodied in software which is used in conjunction with a Web site or the like as well as with telephonic systems having voice recognition and generation capabilities. The present invention provides a more personalized experience for a user interacting visually or aurally with an automated system, thereby improving overall user satisfaction.

As noted above, some levels of personalization are available for interactive computer systems. The method of the present invention represents an improvement over what is currently available by more closely matching computer generated and delivered information to the user's preferred language usage patterns. modifying the style but not the substance of the information provided to the user.

Style sheets are known and principally comprise a summary of editorial conventions to be followed in preparing text for publication or other mode of presentation. Visual style sheets include such features as font, color, page layout and the like but have no effect on the substantive content of the information conveyed.

In a similar manner, aural style sheets include definitions of such aspects as volume, pitch, pronunciation rules, speed as well as such conventions pertaining to how and whether numerals and punctuation marks are presented. Aural style sheets, like conventional style sheets, affect expression rather than the substantive content of the conveyed information.

Using the present invention, in essence, provides visual and aural style sheets enhanced with entries which change substantive aspects of the computer generated and delivered information including personal pronouns and pacing.

Figure 1:
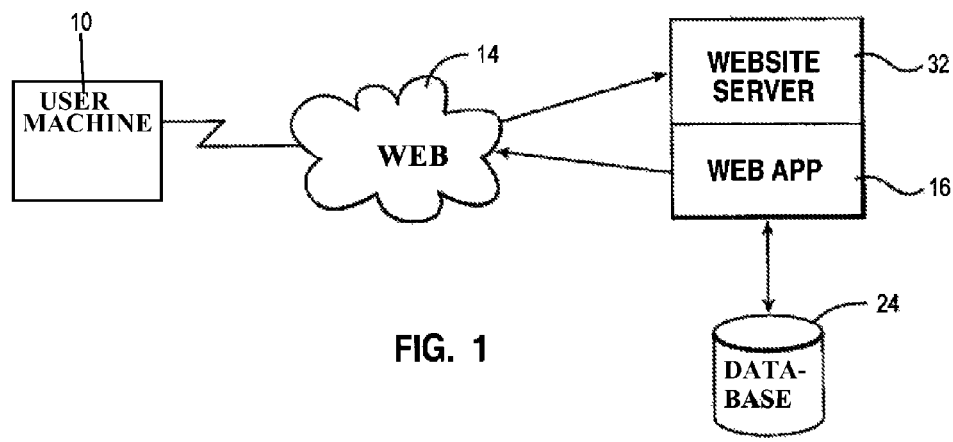
FIG. 1 schematically depicts elements in a visual system embodying the present invention.

Referring now to FIG. 1, an embodiment of the present invention in a graphical interactive computer system will be described. A user machine 10, equipped with a Web browser or the like, is shown bidirectionally connected via the Web 14 to Web application 16 which includes the present invention. Web application 16 interfaces with a database 24 at which user profiles may be created and maintained. Web application 16 connects with a Web site 32 as those skilled in the art will understand.

In operation, the apparatus illustrated in FIG. 1, provides a user upon an attempt to access Web site 32, to then be presented choices by Web application 16. These choices are preferably designed to include relatively short text passages representing a variety of language usage patterns, one of which may be selected by the user. Thereafter, Web application 16 creates a user profile 36 in database 24. Any further communication between Web site 32 and user machine 10 passes through Web application 16 which applies the user profile to information generated by Web site 32 before it is presented to the user.

Text presented by Web application 16 to a user from which the user chooses may, for example, contain identifying parameters which will be saved in database 24. These parameters are not seen by the user. Rather they are flags saved in the database. In the case of pronoun choice, for example, three paragraphs could be presented by Web application 16 to the user. The paragraphs would be pre-written using 'I-You', 'We-They' and 'I-They'. The user would be prompted to select the paragraph found most pleasing. Upon user selection of a paragraph, Web application 16 would store an appropriate, corresponding flag in database 24. Thereafter, Web application 16 would check the user selected pronoun combination flag in database 24 before presenting any further written content to the user and present that content modified to correspond to the user's choice. The content is dynamically modified before presentation based on grammatical rules established in the programming logic.

Figure 2:
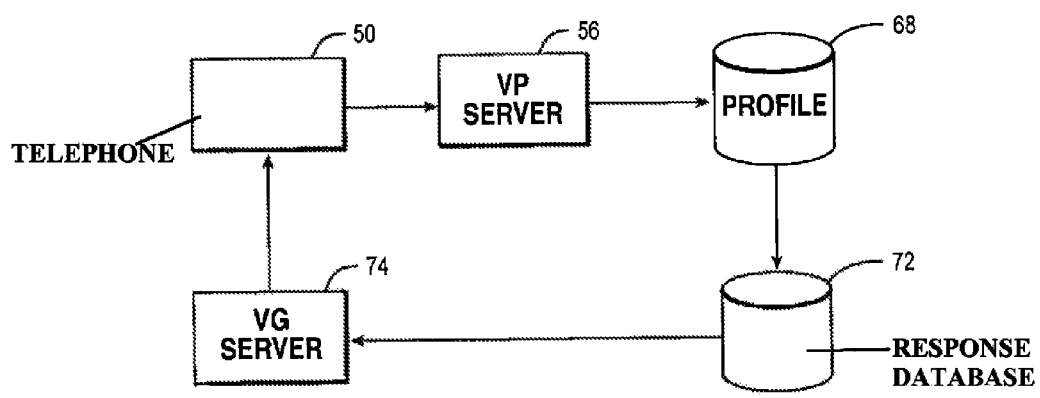
FIG. 2 illustrates elements of the present invention in an aural system.

An implementation of the present invention in an interactive telephonic application will now be described having reference to FIG. 2 which illustrates data flow from the user to and from the computerized system. A user accesses the system of FIG. 2 via telephone 50 in a conventional manner. The present invention is included in server 56 which runs voice processing software and is connected to database 68 for storing customer profile information. Connected also to database 68 is automated voice response database 72. Thus, the user may first be prompted to supply answers to questions presented by server 56, which answers are analyzed to determine the user's preferred language usage preferences as earlier described. Further, the software of the present invention in server 56 determines from its analysis of user responses what settings to put in place for pacing, volume and gender of the voice to be generated to convey information from the automated telephonic application. A customer profile containing these values is created and stored in database 68. A profile stored in database 68 is applied to any data to be subsequently presented to the user from database 62 before that data is input to server 74. Server 74 includes means for generating an aural response to the user of the information from voice response database 72 via telephone 50.

The use of the method of the invention is particularly beneficial with systems such as those used by vehicle rental companies and financial management concerns, but may be adapted to other systems where user satisfaction with a transactional experience is important.

In operation, an exemplary embodiment of the present invention in a voice based system begins when a user calls into a financial portfolio management company or the like. The system greets the user with a voice generated message essentially asking "What would you like to do today?" The application of the present invention then parses the user's response to identify three key factors or parameters: pacing of speech; volume of speech; and gender of speech. These factors are saved in database as part of the user profile. Pacing of speech is saved as words per second. Volume is saved as a decibel level, and gender is saved as male or female as a function of the speaker's (user's) frequency range. Thereafter, for the remainder of the transaction any voice generated responses to the user are modified to utilize the identified and saved parameters. For the rest of the call pacing is set a words per second rate matching that of the user. Volume is set within a decibel level range having predetermined upper and lower limits chosen as a function of the saved user's decibel level. Gender of the saved user parameter is used to select voice response gender.

Those having skill in the art will appreciate that other question and response analyses may be implemented and that a user may be presented with other optional parameters to characterize the remainder of the telephonic transaction.

The present invention provides a more pleasing online or telephonic transaction experience for a user by analyzing user input at the beginning of a transaction and using the results of the analysis to modify the style of the visual or aural, respectively, content thereafter presented to the user. In an online embodiment the user is prompted to choose a style. In a telephonic application the user's vocal input is parsed to determine parameters governing content delivery style.

The above noted and other modifications may be made without departing from the spirit and scope of the present invention as described in the claims appended below.

The invention claimed is:

1. A method for improving user satisfaction of a user at a user machine, said method comprising:
   prompting, by a computer, a user at the user machine to select a language usage pattern preference from a plurality of language usage pattern preference choices respectively comprising a plurality of text passages, each text passage expressing different text;
   after said prompting, said computer receiving from the user machine a language usage pattern preference selected by the user from the plurality of language usage pattern preference choices; and
   said computer storing, in a user profile of the user located in a database accessible to the computer, a flag indicative of the selected language usage pattern preference.

2. The method of claim 1, wherein each text passage comprises a different one or more personal pronouns not comprised by any other text passage of the plurality of text passages.

3. The method of claim 1, wherein the plurality of language usage pattern preference choices consist of three language usage pattern preference choices respectively comprising three text passages.

4. The method of claim 1, wherein the method further comprises:
   after said storing the flag, said computer ascertaining, from the stored flag, the selected language usage pattern preference.

5. The method of claim 1, wherein the computer is located at a web site, wherein the user machine is separated from the web site by a web network, and wherein the method further comprises:

said computer detecting an attempt by the user machine to access the web site via the web network, wherein said prompting is in response to said detecting.

6. The method of claim 5, wherein the method further comprises:

after said storing the flag, said computer ascertaining, from the stored flag, the selected language usage pattern preference;

after said ascertaining, said computer modifying text content to be presented to the user, said modifying comprising applying grammatical rules to the ascertained language usage pattern preference; and said computer providing the modified text content to the user computer for presentation to the user.

7. The method of claim 1, wherein the user machine is a telephone, and wherein the method further comprises:

said computer querying the user at the telephone to determine preferred voice qualities while the computer is engaged in telephone communication with the user via the telephone;

said computer receiving, from the user at the telephone, responses to said querying;

said computer determining from the responses received from the user, using voice recognition functions of the telephonic response system, the preferred voice qualities; and said computer storing, in the user profile, the preferred voice qualities determined from the responses received from the user.

8. The method of claim 7, wherein the method further comprises:

after said storing the preferred voice qualities, said computer accessing the stored preferred voice qualities;

after said accessing the stored preferred voice qualities, said computer modifying responses to the user to be presented to the user, said modifying comprising generating the modified responses, using voice generation functions of the telephonic response system, such that voice qualities in the generated modified responses match the accessed preferred voice qualities; and said computer providing the modified responses to the user at the telephone.

9. The method of claim 7, wherein said storing the preferred voice qualities comprises storing voice qualities comprising pacing of speech expressed as a time rate of speech text, volume of speech expressed as speech loudness, and gender of speech expressed as male or female, and wherein the method comprises determining the gender of speech from a range of sound wave frequency of the responses received from the user to said querying.

10. The method of claim 9, wherein the method further comprises:

after said storing the preferred voice qualities, said computer accessing the stored preferred voice qualities;

after said accessing the stored preferred voice qualities, said computer modifying responses to the user to be presented to the user, said modifying comprising generating the modified responses, using voice generation functions of the telephonic response system, such that voice qualities in the generated modified responses match the accessed preferred voice qualities; and said computer providing the modified responses to the user at the telephone.

11. A computer system, said computer system comprising a computer, said computer configured to perform a method for improving satisfaction of a user at a user machine, said method comprising:

said computer prompting a user at the user machine to select a language usage pattern preference from a plurality of language usage pattern preference choices respectively comprising a plurality of text passages, each text passage expressing different text;

after said prompting, said computer receiving from the user machine a language usage pattern preference selected by the user from the plurality of language usage pattern preference choices; and said computer storing, in a user profile of the user located in a database accessible to the computer, a flag indicative of the selected language usage pattern preference.

12. The computer system of claim 11, wherein each text passage comprises a different one or more personal pronouns not comprised by any other text passage of the plurality of text passages.

13. The computer system of claim 11, wherein the plurality of language usage pattern preference choices consist of three language usage pattern preference choices respectively comprising three text passages.

14. The computer system of claim 11, wherein the method further comprises:

after said storing the flag, said computer ascertaining, from the stored flag, the selected language usage pattern preference.

15. The computer system of claim 11, wherein the computer is located at a web site, wherein the user machine is separated from the web site by a web network, and wherein the method further comprises:

said computer detecting an attempt by the user machine to access the web site via the web network, wherein said prompting is in response to said detecting.

16. The computer system of claim 15, wherein the method further comprises:

after said storing the flag, said computer ascertaining, from the stored flag, the selected language usage pattern preference;

after said ascertaining, said computer modifying text content to be presented to the user, said modifying comprising applying grammatical rules to the ascertained language usage pattern preference; and said computer providing the modified text content to the user computer for presentation to the user.

17. The computer system of claim 11, wherein the user machine is a telephone, and wherein the method further comprises:

said computer querying the user at the telephone to determine preferred voice qualities while the computer is engaged in telephone communication with the user via the telephone;

said computer receiving, from the user at the telephone, responses to said querying;

said computer determining from the responses received from the user, using voice recognition functions of the telephonic response system, the preferred voice qualities; and said computer storing, in the user profile, the preferred voice qualities determined from the responses received from the user.

18. The computer system of claim 17, wherein the method further comprises:

after said storing the preferred voice qualities, said computer accessing the stored preferred voice qualities;

after said accessing the stored preferred voice qualities, said computer modifying responses to the user to be presented to the user, said modifying comprising generating the modified responses, using voice generation functions of the telephonic response system, such that voice qualities in the generated modified responses match the accessed preferred voice qualities; and said computer providing the modified responses to the user at the telephone.

19. The computer system of claim 17, wherein said storing the preferred voice qualities comprises storing voice qualities comprising pacing of speech expressed as a time rate of speech text, volume of speech expressed as speech loudness, and gender of speech expressed as male or female, and wherein the method comprises determining the gender of speech from a range of sound wave frequency of the responses received from the user to said querying.

20. The computer system of claim 19, wherein the method further comprises:

after said storing the preferred voice qualities, said computer accessing the stored preferred voice qualities;

after said accessing the stored preferred voice qualities, said computer modifying responses to the user to be presented to the user, said modifying comprising generating the modified responses, using voice generation functions of the telephonic response system, such that voice qualities in the generated modified responses match the accessed preferred voice qualities; and said computer providing the modified responses to the user at the telephone.

* * * * *